United States Patent [19]
Adams

[11] 3,733,120
[45] May 15, 1973

[54] FILM DRIVE, AND CINEMATOGRAPHIC APPARATUS INCORPORATING THE SAME

[75] Inventor: Lloyd M. Adams, Santa Ana, Calif.

[73] Assignee: Geotel, Inc., Amityville, Long Island, N.Y.

[22] Filed: June 11, 1971

[21] Appl. No.: 152,359

Related U.S. Application Data

[60] Division of Ser. No. 843,892, June 16, 1969, Pat. No. 3,586,224, which is a continuation-in-part of Ser. No. 528,718, Feb. 21, 1966, abandoned.

[52] U.S. Cl. ............352/187, 226/76, 226/156, 352/163, 352/180
[51] Int. Cl. ............................................G03b 21/48
[58] Field of Search..............352/180, 188, 166, 352/163, 187; 226/76, 156

[56] References Cited

UNITED STATES PATENTS 2,463,548  3/1949  Mitchell...............................352/166
3,224,830  12/1965  Mitchell...............................352/180

Primary Examiner—Samuel S. Matthews
Assistant Examiner—Monroe H. Hayes
Attorney—Gausewitz, Carr & Rothenberg

[57] ABSTRACT

A cinematographic apparatus which incorporates, as the film-drive mechanism therein, a differential gear having two inputs and one output, the latter being connected to the sprocket which drives the film. One of the inputs is driven at a constant speed, and the other is driven alternately in opposite directions by a cam, the cam being so shaped that the film will alternately advance and dwell in intermittent manner. Locking apparatus is provided to insure that the film remains absolutely stationary during each dwell period, despite variations of or wear in the drive components. A mechanism is provided to disengage the cam from such other input, so that the film may be driven rapidly in a nonintermittent manner and still maintain precise framing. A framing mechanism is provided to achieve correct framing, in a manner which is not subject to creep, without destroying the proper phase relationship with the shutter.

33 Claims, 21 Drawing Figures

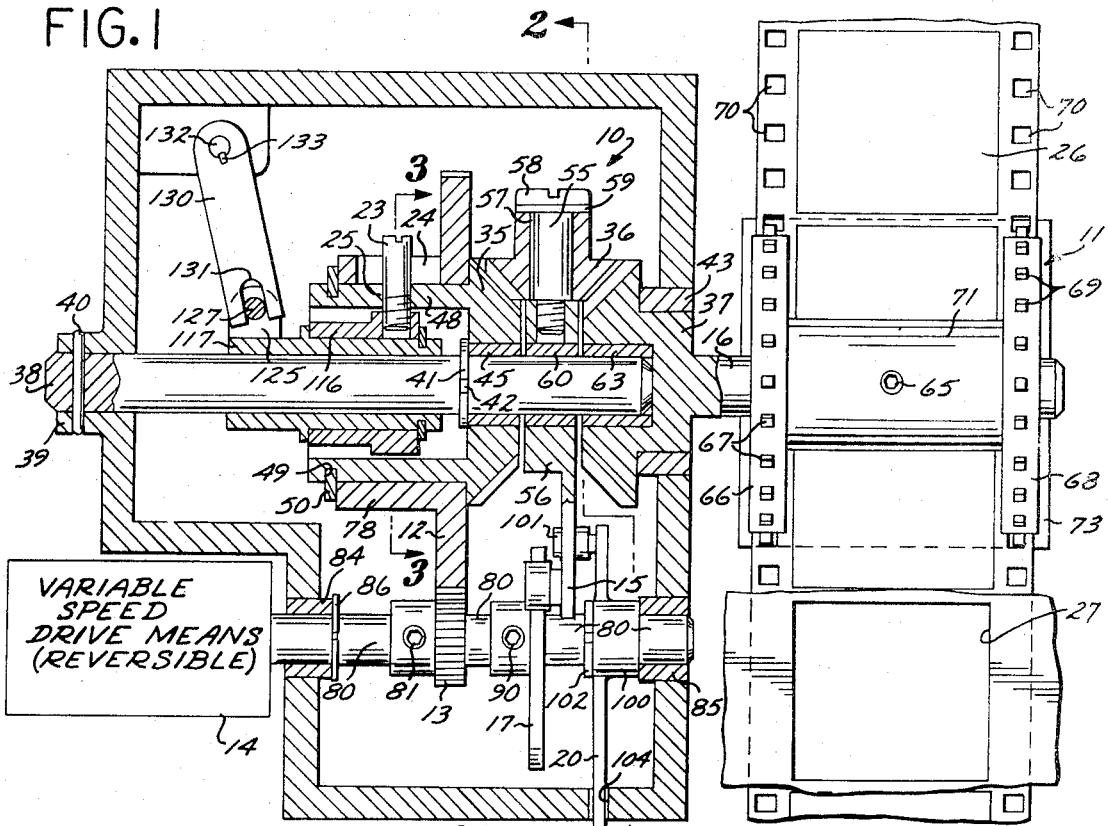
FIG.1
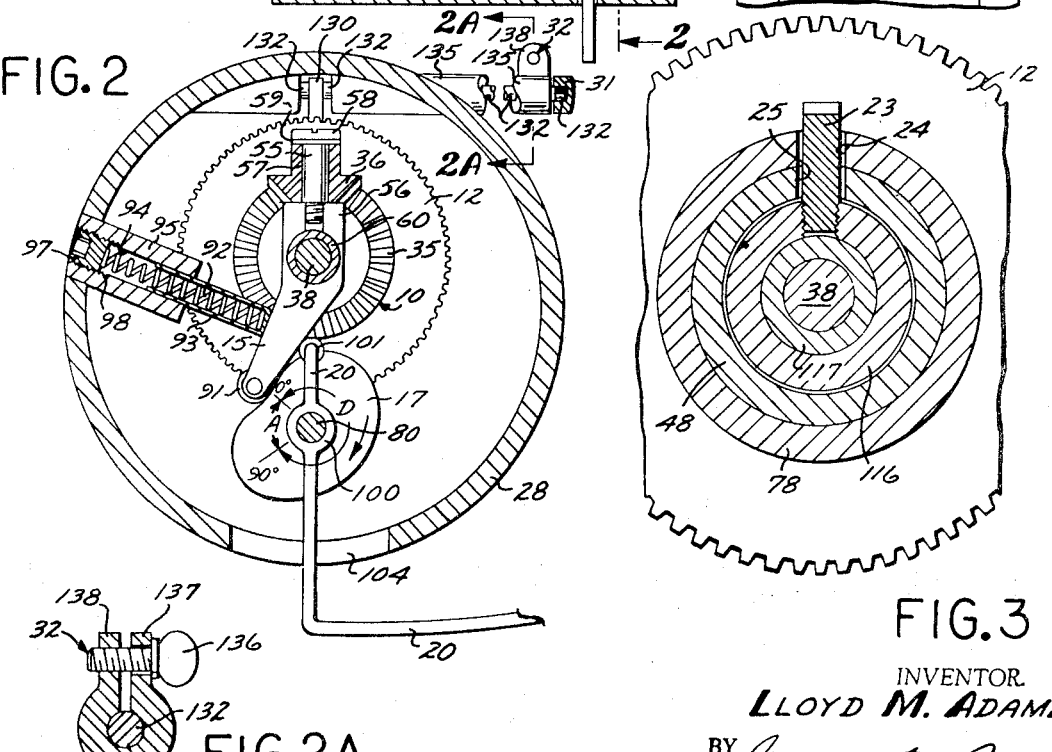
FIG.2
FIG.2A
FIG.3
INVENTOR.
LLOYD M. ADAMS

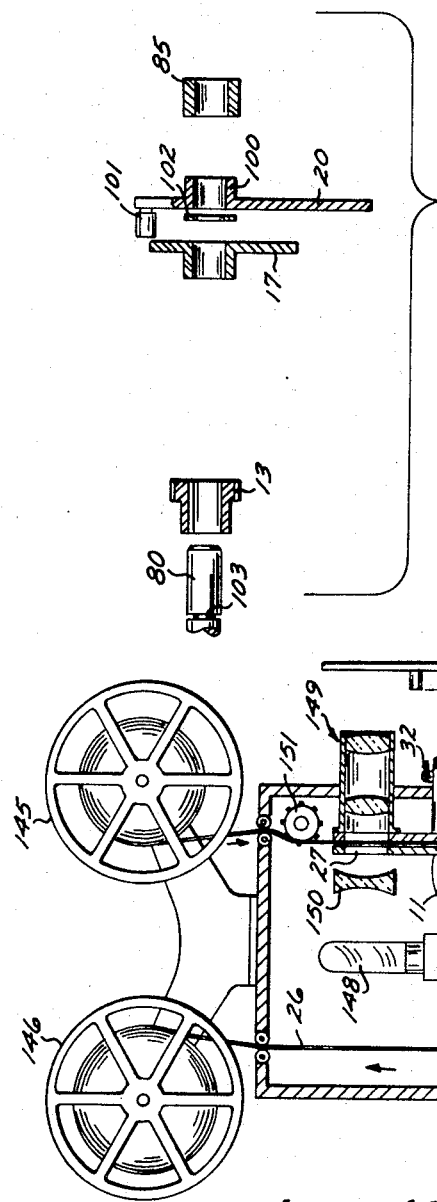

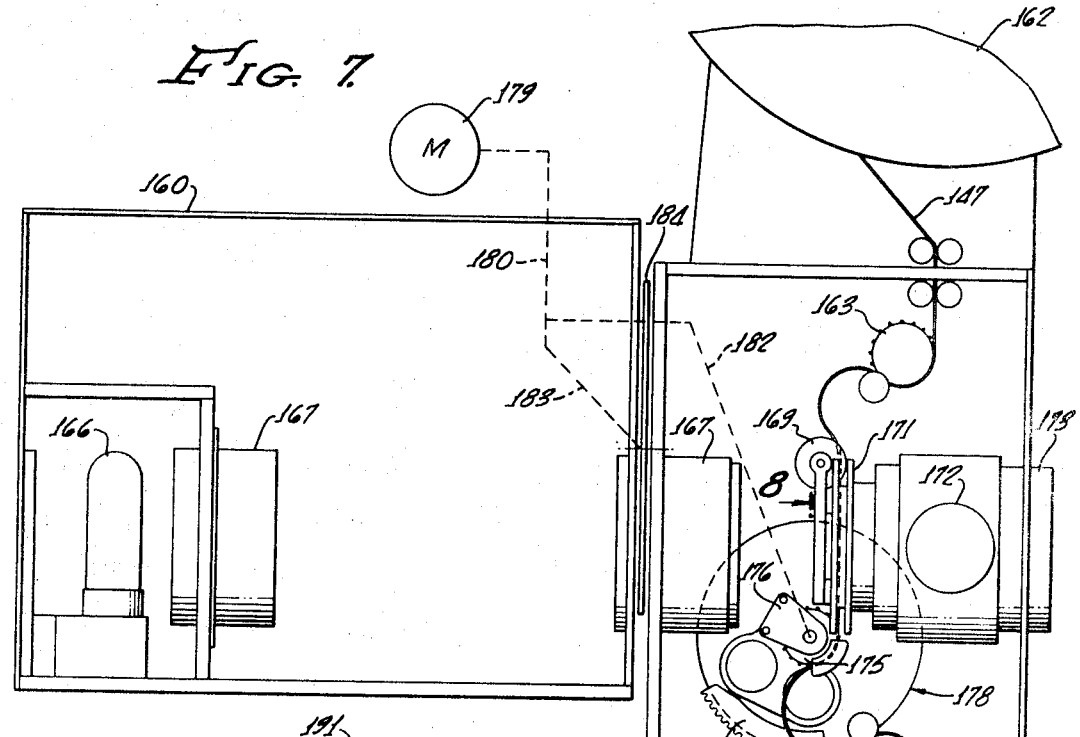
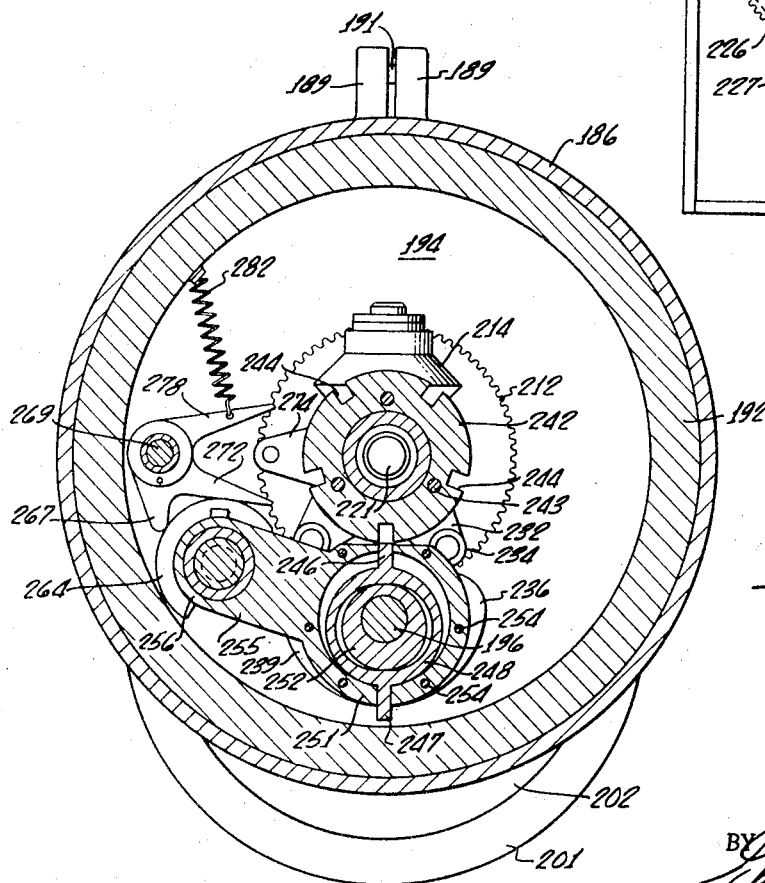

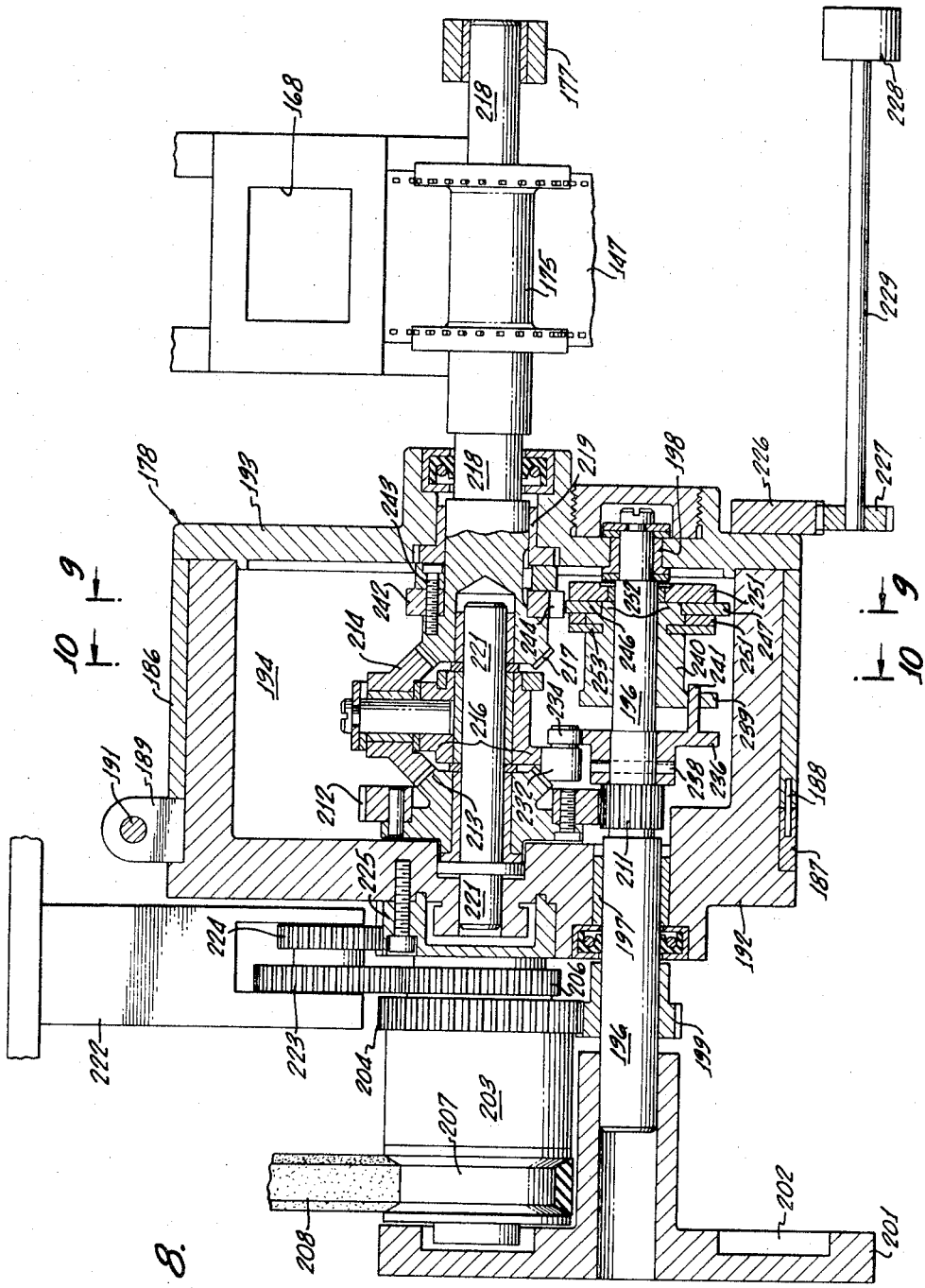

INVENTOR.
LLOYD M. ADAMS
ATTORNEYS.

INVENTOR.
LLOYD M. ADAMS

BY
ATTORNEYS.

FILM DRIVE, AND CINEMATOGRAPHIC APPARATUS INCORPORATING THE SAME

CROSS-REFERENCES TO RELATED APPLICATIONS

This application is a division of copending application Ser. No. 843,892, filed June 16, 1969, for Film Drive, and Cinematographic Apparatus Incorporating The Same now U.S. Pat. No. 3,586,224. Said application Ser. No. 843,892 is in turn, a continuation-in-part of patent application Ser. No. 528,718, filed Feb. 21, 1966, for a Film Drive, now abandoned.

BACKGROUND OF THE INVENTION

1. Field of the Invention

This invention relates to the field of cinematographic apparatus, particularly motion picture projectors.

2. Description of the Prior Art

Conventional motion picture projectors known to applicant may not be operated in the slew or continuous film-transport mode (as distinquished from the cine or intermittent film-transport mode) and stil cause precise framing to be maintained after slew operation is discontinued. This has been a major obstacle to the fully automated operation of motion picture projectors, for example by computers. In addition, with conventional projectors it has been difficult or impossible to bring various channels of multi-channel projectors into exact synchronism, by shifting into the slew mode and without loss of framing adjustment, any time the computer or other control means so directs.

Conventional projectors are also subject to the disadvantage that the film tends to tear or wear out rapidly, especially around the sprocket holes, this being because the film is jerked by the conventional film-drive means. Also, conventional projectors require that substantial pressure be exerted by the pressure (or guide) plate on the film in order to maintain film registry from frame to frame. There is therefore a distinct need for a film drive whereby the film is smoothly accelerated and decelerated as distinguished from being jerked, and which operates in such manner that the velocity, acceleration and displacement factors become zero gradually—not abruptly.

There exist patents which describe epicyclic mechanisms for converting continuous rotation of an input shaft to intermittent rotation of an output shaft, but the described mechanisms are deficient relative to one or more of the following major factors:

1. The output shaft is not 100 percent stationary during each dwell period, so that the mechanism is not commercially satisfactory for use in theater projectors.
2. There is no satisfactory means for changing from intermittent motion of the output shaft to continuous motion thereof.
3. There is no satisfactory means for changing the precise position or "phase" of the output shaft, particularly while the mechanism is operating, and in a permanent manner which is not subject to the effects of vibration, etc.
4. The mechanisms are excessively noisy, complex, bulky, imprecise in operation, and lacking in ruggedness.

The following patents are cited relative to the present invention: U.S. Pat. Nos. 857,832, 1,162,037, 1,975,126, 2,547,634, 2,655,817, 2,845,808, 2,969,910, 3,076,351, 3,162,055, 3,355,956.

SUMMARY OF THE INVENTION

In accordance with one of its aspects, the invention comprises a means to effect positive locking of the output shaft of the film drive during dwell periods of such shaft, in combination with an epicyclic drive adapted to achieve such dwell periods despite the fact that one input shaft rotates continuously. In accordance with another aspect, the invention relates to an epicyclic film drive in combination with means to effect fast-forward or fast-reverse slew operation when desired and without at any time breaking the connection between the output shaft and a continuously rotating input shaft, so that precise framing is maintained after the slew operation is discontinued. In accordance with a third aspect, the invention relates to means for achieving framing in a projector incorporating an epicyclic film drive, such framing being achieved without at any time disturbing the relationship between the film drive and the shutter, and in such manner that creep will not occur. The invention additionally relates to a new combination of a differential film drive with the feeding means and other elements of a motion picture projector, the combination resulting in a projector having greatly improved characteristics in regard to prevention of wearing of the film, quietness, and other factors.

BRIEF DESCRIPTION OF THE DRAWINGS

FIG. 1 is a central sectional view illustrating a film drive unit constructed in accordance with a first embodiment of the present invention;

FIG. 2 is a transverse section taken on line 2—2 of FIG. 1;

FIG. 2A is a fragmentary sectional view taken on line 2a—2a of FIG. 2;

FIG. 3 is a fragmentary sectional view taken on line 3—3 of FIG. 1;

FIG. 4 is an exploded view, partially in section, of the differential gear assembly of FIG. 1, the adjustable drive means for the differential gear assembly, and the sprocket assembly driven by the differential gear assembly;

FIG. 4A is a fragmentary plan view of one of the parts shown in elevation in FIG. 4;

FIG. 5 is an exploded view, partially in section, of the means mounted on drive shaft 80;

FIG. 6 is a sectional view schematically illustrating a projector incorporating the film drive;

FIG. 7 is a vertical section view schematically representing a motion picture projector incorporating a film drive constructed in accordance with a second embodiment of the present invention;

FIG. 8 is a transverse sectional view taken on line 8—8 of FIG. 7;

FIGS. 9 and 10 are, respectively, sectional views on lines 9—9 and 10—10 of FIG. 8;

DETAILED DESCRIPTION OF THE FIRST EMBODIMENT (FIGS. 1-6)

Figure 10:
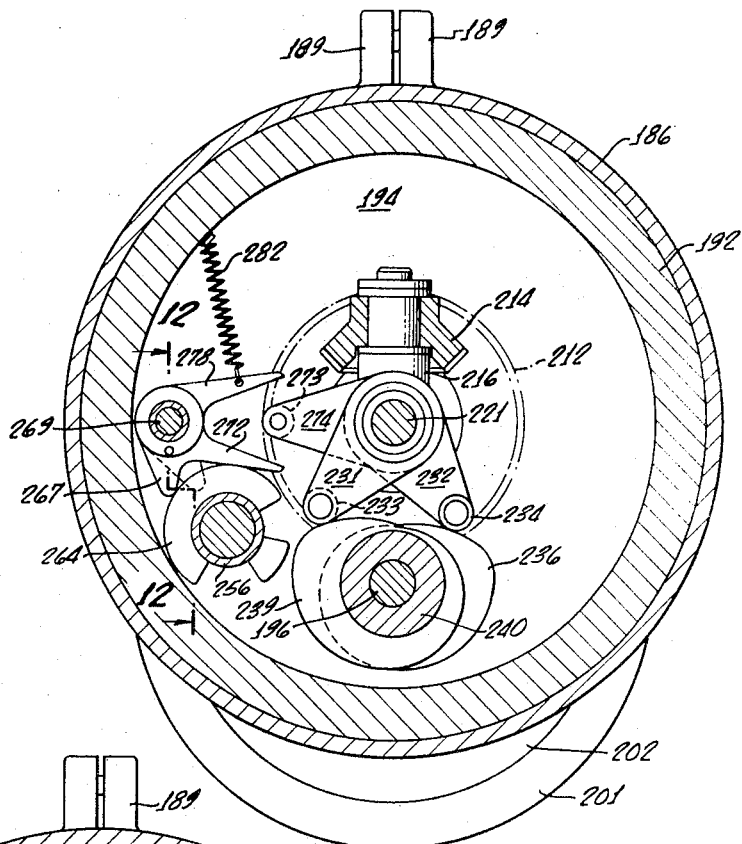

Referring to the drawings, a cinematographic apparatus embodying the invention may be seen to comprise a film drive including a differential gear assembly 10 which drives a film sprocket assembly 11. Differential gear assembly 10 is driven by a gear 12 which is driven by a pinion 13, pinion 13 being rotated at a substantially uniform speed by a reversible drive means 14.

As best seen in FIG. 2, differential assembly 10 is provided with an input arm 15. By rocking input arm 15 about the axis of differential assembly 10, alternating increments of rotational speed may be combined with the uniform rotational speed imparted to differential assembly 10 by gear 12, as hereinafter explained. The result of this combining of speeds is manifested as nonuniform rotational motion of the output shaft 16 of differential assembly 10, and of film sprocket assembly 11.

As also best seen in FIG. 2, said alternating increments of rotational speed are imparted to differential assembly 10 by a cam 17, which rocks input arm 15. Thus, the kinematic characteristics of said nonuniform rotational motion of output shaft 16 and film sprocket assembly 11 are determined by the contour of cam 17. It follows that selection of a suitable contour for cam 17 will result in said nonuniform rotational motion of output shaft 16 and film sprocket assembly 11 being an intermittent rotational motion characterized by far more desirable, i.e., less violent, accelerations and decelerations between its dwell periods than has hitherto been achieved in film drives as simple and inexpensive as the device of the present invention. The contour of cam 17 is so selected in carrying out the present invention.

A further feature of the present invention resides in the provision of a motion selector arm 20 (FIG. 2) by means of which input arm 15 may be disengaged from cam 17 and held stationary, thereby canceling the varying increment of rotational speed normally imparted to differential assembly 10 by cam 17, and causing output shaft 16 and film sprocket assembly 11 to rotate at uniform speed. By this means, sprocket assembly 11 is enabled to transport film at a uniform speed by simple manipulation of a single control, i.e., motion selector arm 20. As above indicated, said uniform speed is the "continuous" or "slew" mode of operation. It is to be distinguished from the "intermittent" or "cine" mode of operation.

Yet another feature of the present invention resides in the provision of a movable pin or crank 23 coacting with a straight slot 24 in the hub of gear 12, and with a generally curved or spiral slot 25 in the cylindrical flange portion of the input bevel gear of differential assembly 10, to vary the phase angle between gear 12 and the input bevel gear about their common axis. By this means, the dwell positions of the frames of the film 26 may be adjusted with respect to a stationary film gate, or projection aperture, 27 constituting part of the projector or camera in which the film drive of the invention is employed. The position of movable pin 23, and thus the dwell position of said frames with respect to said gate, or said aperture, may be adjusted externally of the housing 28 of the film drive device by means of a frame adjustment knob 31 and locking means 32 (FIGS. 2 and 6), as described hereinafter. This is the "framing" adjustment of the first embodiment.

Proceeding first to a detailed description of differential assembly 10, this assembly may be seen to comprise three bevel gears 35, 36 and 37. The input and output bevel gears, 35 and 37, respectively, have equal numbers of teeth and are rotatably mounted upon a shaft 38 which is affixed in the boss portion 39 of housing 28 by means of a pin 40. The intermediate bevel gear (a planet gear) 36 is mounted for revolution about shaft 38, in constant mesh with both bevel gears 35 and 37, by means of an intermediate gear carrier described hereinafter. Bevel gears 35, 36 and 37 are maintained in permanently intermeshed relation by a retaining ring 41, which is secured in a groove 42 formed in shaft 38, and by a bearing 43 mounted in housing 28. It is not necessary that the input and output gears have equal numbers of teeth, since it would be possible to use appropriate intermediate gears.

Input bevel gear 35, which is rotatably mounted upon shaft 38 by a bearing 45, is provided with a concentric cylindrical flange, or skirt, 48, the inner diameter of which is sufficiently greater than the diameter of shaft 38 to permit the means carrying movable pin 23, described hereinafter, to pass freely therebetween. Cylindrical flange 48 is also provided with a a spiral slot 25 and an annular groove 49 for a retaining ring 50, all as best seen in FIG. 4.

Intermediate bevel gear 36 (FIG. 2) is rotatably mounted upon a stud 55 which is affixed to an intermediate gear carrier 56. A suitable bearing 57 may be provided to insure free rotation of intermediate bevel gear 36 about stud 55. Intermediate bevel gear 36 is maintained in position upon intermediate gear carrier 56, and thus in mesh with gears 35 and 37, by the head 58 of stud 55, a suitable thrust washer 59 being provided between the hub of intermediate bevel gear 36 and head 58 of stud 55 to assure free rotation of intermediate bevel gear 36. Intermediate gear carrier 56 is rotatably mounted on shaft 38 by means of a suitable bearing 60. Input arm 15, which coacts with cam 17 as described hereinbelow, is integral with intermediate gear carrier 56.

Thus, it may be seen that intermediate gear 36 is so mounted as to be revolvable about shaft 38 at such a distance therefrom as to be permanently intermeshed with input bevel gear 35 and output bevel gear 37, and to be rotatable about an axis perpendicular to shaft 38. Further, the angular position of intermediate gear 36 about shaft 38 is determined by arm 15 of intermediate gear carrier 56.

Output bevel gear 37 of differential assembly 10 is rotatably mounted upon shaft 38 by means of a suitable bearing 63. Output bevel gear 37 is also journaled in housing 28 by means of the bearing 43.

Provided axially on gear 37 is an integral output shaft 16 to which film sprocket assembly 11 is affixed by means of, for instance, a set screw 65.

The film sprocket assembly 11 will next be described, and comprises a first sprocket wheel 66 having, for example, 24 sprockets 67 and a second sprocket wheel 68 having 24 sprockets 69. Sprockets, or sprocket teeth, 67, 69 are constructed and arranged to coact with an equal number of the sprocket holes 70 in film 26 to impel film 26 upwardly or downwardly as seen in FIG. 1. Since the film 26 has four sprocket holes 70 per frame, in this example, the sprocket wheels 66, 68, having 24 teeth each, are called "six-frame sprockets" in the art. The teeth effect a positive and nonslip connection between the film and the output of the differential.

Sprocket wheels 66 and 68 are affixed to the opposite ends of a sleeve 71 which is affixed to output shaft 16 of differential assembly 10 by means of the set screw 65.

A retractable guide plate 73 is provided behind film 26, as seen in FIG. 1, to assure that the teeth of both sprocket wheels engage sprocket holes 70 of film 26. Suitable slots are provided in guide plate 73 to allow the outer tips of the sprocket teeth to pass slightly behind the surface of guide plate 73 which is adjacent film 26. While a sprocket-type film drive is described, it will be apparent that the invention may also be used in sprocketless film drive systems.

The gear 12 will next be described, and, as best seen in FIG. 4, is provided with a cylindrical hub 78. The hub, in turn, is provided with a straight slot 24 parallel to the axis of the gear. The inside diameter of hub 78 is sufficiently larger than the outside diameter of cylindrical flange 48 of input bevel gear 35. Gear 12 is retained upon cylindrical flange 48 by the outer portion of bevel gear 35 at one end and by retaining ring 50 which is locked in slot 49 in cylindrical flange 48 at its other end.

Pin 23 is maintained within slot 24 of hub 78 and slot 25 of cylindrical flange 48 by means which will be described hereinbelow. For purposes of the present discussion of gear 12 and its function, it will be assumed in this section of the specification that pin 23 is maintained against motion parallel to shaft 38, but is allowed to freely rotate about shaft 38 in constant engagement with the walls defining slots 24 and 25. Thus, since pin 23 is fixed against longitudinal motion along shaft 38, but engages the walls of slots 24 and 25, as assumed, it follows that gear 12 is locked against rotation with respect to input bevel gear 35 of differential assembly 10. This being the case, any rotation imparted to gear 12 is also imparted to input bevel gear 35.

As best seen in FIG. 1, gear 12 meshes with pinion 13, which is affixed to a drive shaft 80 as by a set screw 81. Gear 12, for example, has six times as many teeth as pinion 13. Drive shaft 80 is rotated at a substantially uniform selected speed by variable-speed, reversible drive means 14 (FIG. 1). Drive means 14 is of the conventional type provided in cameras and projectors and may, for instance, comprise a variable-speed electric motor 82 as shown in FIG. 6. Thus, it may be seen that, when drive means 14 is operating, input bevel gear 35 of differential gear assembly 10 is rotated about shaft 38 at a substantially uniform speed. Drive shaft 80 is journaled in housing 28 by means of suitable bearings 84 and 85, and is locked (by a snap ring 86) against axial shifting.

As best seen in FIG. 2, input arm 15 of differential assembly 10, and which is integral with intermediate gear carrier 56 as explained hereinabove, has a cam follower wheel 91 rotatably mounted in its lower end. Cam follower wheel 91 is maintained in contact with the outer contour of the cam 17 (which is fixed by a set screw 90 to the drive shaft 80) by the pressure exerted on the side of arm 15 opposite cam 17 by a coil spring 92. Spring 92 is contained in an elongated cup 93 for mechanical rigidity. Elongated cup 93 fits slidably in the bore 94 of a guide sleeve 95, thus fixing the direction of the force applied to input arm 15 by spring 92. Guide sleeve 95 is affixed in the wall of housing 28. The pressure exerted against input arm 15 by spring 92 may be regulated by means of a screw 97 in the threaded portion 98 of bore 94.

Considering now the interrelationship of cam 17 and input arm 15, as shown in FIG. 2, and taking into consideration the fact that arm 15 and intermediate gear carrier 56 with which arm 15 is integral are constrained to rotational motion about shaft 38, it may be seen that cam 17 functions to cyclically impart alternating (i.e., alternate, oppositely directed) increments of rotational speed to intermediate gear carrier 56 via input arm 15. That is, cam 17 serves to impart clockwise increments of rotational speed (as seen in FIG. 2) to arm 15 and intermediate gear carrier 56 when its radius in contact with cam follower wheel 91 is increasing, i.e., during contact of wheel 91 with arc A, and to impart counterclockwise increments of rotational speed to input arm 15 and intermediate gear carrier 56 when its radius in contact with cam follower wheel 91 is decreasing, i.e., when wheel 91 is in contact with arc D. Thus, for instance, cam 17, as shown in FIG. 2, will impart a clockwise increment of rotational speed to intermediate gear carrier 56 during its next 90° of rotation, and then will impart a counterclockwise increment of rotational speed to intermediate gear carrier 56 during the remaining 270° of its rotation. Since, as explained hereinabove, intermediate gear 36 is mounted upon intermediate gear carrier 56 remote from shaft 38, it follows that intermediate gear 36 will be revolved about the axis of shaft 38 with the same alternating increments of speed with which intermediate gear carrier 56 is rotated about shaft 38. Thus, as will be explained hereinbelow, said alternating increments of rotational speed will be combined with the uniform rotational speed imparted by gear 12 to input gear 35 to cause output gear 37, including shaft 16 and sprocket 68, to be rotated intermittently in accordance with any preselected ratio of advance to dwell within a cycle.

From the above, it may be seen that the nature of the intermittent rotational motion imparted to shaft 16 may be selected at the will of the designer over a much wider range than was the case in the prior art. For example, very long dwell periods may be obtained without the violent action therebetween which characterizes many prior-art film drive devices.

MOTOR SELECTOR MECHANISM

The motion selector arm 20 has a hub 100 which is rotatably mounted upon drive shaft 80. At its outer end, arm 20 is provided with a rotatably mounted antifriction roller 101, which facilitates the use of motion selector arm 20 by thrusting arm 15 out of contact with cam 17 against the bias of spring 92. As seen in FIG. 1, the motion selector arm 20 is maintained in a predetermined position at which roller 101 may coact with input arm 15, by means of snap ring 102 at one end of its hub 100 and bearing 85 at the other end thereof. A suitable groove 103 to accommodate snap ring 102 is provided in drive shaft 80 (FIG. 5).

An opening 104 is shown for simplicity in housing 28, whereby motion selector arm 20 is made accessible to the operator of the projector or camera device employing the present invention. As shown in FIG. 6, arm 20, after passing through opening 104, may be so configured as to extend through the housing of a projector, for example, in which the present invention is employed. Thus, the operator of the projector of FIG. 6, by pulling outwardly on the extension of arm 20 shown outside the projector housing, may thrust input arm 15 out of contact with cam 17, thereby canceling the alternating increments of rotational speed normally imparted to intermediate gear carrier 56, and causing film 26 to be continuously, rather than intermittently, transported between reels. When arm 15 is thus out of contact with cam 17, the arm is held stationary between roller 101 and spring cup 93. Additional means may be provided to lock motion selector arm 20 in the position in which it disengages arm 15 and cam follower wheel 91 from cam 17, such as an electrically activated linkage, although for some purposes a simple manual selector device of the type shown herein will be preferred.

In the illustrated embodiment, continuous reverse motion for rewinding film 26 may be imparted to the sprocket assembly by reversing drive means 14 while arm 15 and wheel 91 are withdrawn from cam 17. In either forward or reverse continuous motion, the speed of drive means 14 may be increased for more rapid reeling.

For reverse intermittent motion, it is desirable to provide a double-acting cam (not shown) having a groove contoured to resemble the outer contour of cam 17. Such groove coacts with wheel 91, whereby wheel 91 (and arm 15) is positively driven inwardly toward shaft 80, rather than outwardly only as in the illustrated embodiment.

FRAMING MECHANISM

Pin or crank 23 is maintained in its operating position within curved slot 25 of cylindrical flange 48 of input bevel gear 35, and also within straight slot 24 of ring gear hub 78, by being screwed into a tapped hole 115 (FIG. 4) in a sleeve 116. Since the inside diameter of sleeve 116 is sufficiently large to permit an inner sleeve 117 to be nested therein, sleeve 116 will hereinafter be called outer sleeve 116. When inner sleeve 117 is nested in outer sleeve 116, the two sleeves are rotatable relative to each other. In order to maintain outer sleeve 116 against longitudinal motion relative to the inner sleeve, however, a groove 118 is provided in inner sleeve 117 into which a snap ring 119 can be inserted after outer sleeve 116 has been passed onto inner sleeve 117 until stopped by a flange 120. Thus, outer sleeve 116 and pin 23 are mounted upon inner sleeve 117 in such a manner as to be rotatable with respect to inner sleeve 117, but locked to inner sleeve 117 for longitudinal motion therewith. As best seen in FIG. 4A, inner sleeve 117 is provided at its end remote from snap ring groove 118 with a pair of ears 125, 126 and a pin 127 extending therebetween, the function of which will be described hereinbelow.

The inner sleeve 117 is mounted slidably upon shaft 38. The position of the inner sleeve 117 upon such shaft is determined by an arm 130 which has, in its inner end, a slot 131 for reception of pin 127 (FIG. 4A) between ears 125 and 126. Since the slotted inner end of arm 130 is confined between ears 125 and 126, inner sleeve 117 is prevented from rotating about shaft 38.

The angular position of arm 130, and, thus, the position of inner sleeve 117 along shaft 38, is determined by a shaft 132, to which arm 130 is affixed by means of a key 133. That is, the angular position of arm 130, and thus the position of inner sleeve 117 along shaft 38, is determined by the angular position of shaft 132 about its own axis. As best seen in FIG. 2, however, shaft 132 extends through a cylindrical extension 135 of housing 28, and has frame adjustment knob 31 locked to its outer end, as by a key.

Thus, the position of inner sleeve 117, outer sleeve 116 and pin 23 along shaft 38 may be adjusted by means of frame adjustment knob 31 from outside housing 28. When adjusted as desired, shaft 132, and thus sleeves 116 and 117 and pin 23, may be locked in position by locking means 32. As best seen in FIG. 2a, locking means 32 comprises a thumb screw 136 which passes through a clearance hold in an ear 137 and engages a threaded hold in an ear 138. Ears 137 and 138 are integral with housing extension 135 and are located on opposite sides of a slot 139 therein, thus forming a slotted collar locking arrangement of the well-known type. From the foregoing, it may be seen that the longitudinal position of pin 23 along the shaft 38 may be adjusted from outside housing 28 by means of frame adjustment knob 31, whereupon pin 23 may be locked into the selected longitudinal position by means of thumb screw 136, while at the same time pin 23 is free to revolve about shaft 38 in engagement with slots 24 and 25 through locked by thumb screw 136 against motion along shaft 38.

Unlike pin 23, however, neither cylindrical flange 48 (including spiral slot 25) nor hub 78 (including straight slot 24) is movable longitudinally on shaft 38. Thus, longitudinal movement of pin 23 along shaft 38 is necessarily accompanied by longitudinal movement of pin 23 along straight slot 24. Since slot 25 is of spiral configuration, however, while slot 24 is straight, there can be only one angular orientation of hub 78 with respect to cylindrical flange 48 at which a pin having a diameter substantially equal to the width of the slots (FIG. 3) can pass through both slots for a given position of said pin along slot 24. That is to say, each possible position of pin 23 along slot 24 corresponds to one and only one orientation of hub 78 with respect to clyindrical flange 48. Thus, the orientation of hub 78 with respect to cylindrical flange 48, and the orientation of input bevel gear 35 with respect to gear 12, may be determined by the position of pin 23 along slot 24. Since slots 24 and 25 are longitudinally movable with respect to shaft 38 under control of frame adjusting knob 31, the orientation of input bevel gear 35 with respect to gear 12 is directly controllable by means of frame adjusting knob 31.

As explained hereinbelow, the dwell position of the frames of film 26 with respect to gate, or aperture, 27 (FIGS. 1 and 6) is a function of the orientation of input bevel gear 35 with respect to gear 12. Therefore, the location of the frames of film 26 with respect to gate 27 is controllable by means of frame adjustment knob 31 and locking means 32. Accordingly, in a projector employing the film drive means of the present invention, and having the conventional supply reel 145, take-up reel 146, film 26, projector lamp 148, projection optics 149, collimator 150, and sprockets 151, 152 and 153, as shown in FIG. 6, the projector operator may center the dwell position of the frames on film 26 in projection aperture 27, and thus vertically center the picture projected by the projector on the associated screen, by means of frame adjustment knob 31, thereafter locking the motion picture so projected in place upon the screen by the locking means 32. The projector also incorporates a shutter, which is schematically shown at S, and which is driven from motor 82 by a drive schematically shown at D.

Differential gear assembly 10 comprises an epicyclic train of the type known as bevel epicyclic trains, though it is to be understood that certain aspects of the present invention are not limited to devices employing epicyclic trains nor, when epicyclic trains are used, to bevel epicyclic trains.

The terms "revolve," "revolving," and "revolution" are used herein in their broadest sense, and thus embrace those motions which may be referred to by the terms "rotate," "pivot," etc. That is, the term "revolve" and its derivatives are used herein to denote turning motion about an axis whether that axis passes through the turning body or not. Further, the term "revolve" and its derivatives as used herein embrace the type of turning motion in which a body turns about an axis through less than a full revolution as in the motion of intermediate gear carrier 56 described hereinabove.

DESIGN EXAMPLE, AND OPERATION

Differential gear assembly 10 functions in the device of the invention as a mechanical shaft-speed adder of the type known in the analog computation arts, and described in treatises dealing with that subject, e.g., Basics of Analog Computers, T.D. Truitt and A. E. Rogers, John F. Rider Publisher, Inc., New York, 1960, pages 1-48. As explained in such treatises, the rotational speeds $X_{35}$ and $X_{37}$ of axial gears 35 and 37, respectively, about shaft 38 are related to the speed of revolution $X_{36}$ of intermediate gear 36 about shaft 38 by the following formula:

$$X_{36} = (X_{35} + X_{37})/2 \qquad (1)$$

The form of this formula is convenient when, as in the more usual applications of a mechanical shaft speed adder, the two axial gears are used as inputs and the intermediate gear is used as the output. In differential gear assembly 10, however, intermediate gear 36 and axial gear 35 are used as inputs, and the other axial gear 37 is used as the output. For this reason, it is convenient to recast the above formula, taking $X_{37}$ as the dependent variable, and this may be done by simple algebraic manipulation because the gears of differential gear assembly 10 are permanently intermeshed. As the result of such algebraic manipulation the above formula can be seen to take the form:

$$X_{37} = 2X_{36} - X_{35} \qquad (2)$$

Given this modified formula (2), and certain arbitrarily selected design criteria assumed in constructing the illustrated embodiment, which is only one of numerous possible examples, the operation of the differential gear assembly and cooperating cam 17 will now be described in detail.

Said design criteria can be stated as follows, calling the period of time consumed in advancing the film an "advance period," the immediately succeeding time during which the film is stationary a "dwell period," and the sum of these two periods a "frame period:"

a. Each advance period occupies the first quarter of its corresponding frame period.

b. Each dwell period occupies the last three-quarters of its corresponding frame period.

Referring to FIG. 2, the sector of cam 17 marked A corresponds to the advance period, and the sector marked D corresponds to the dwell period.

The contour of cam 17, and particularly the dwell period section D thereof, will first be considered.

Since no net forward motion of film 26 can be imparted thereto by arm 15, which must be rocked as far clockwise as counterclockwise during each frame period, it follows that the net amount of film advance corresponding to each full rotation of cam 17 may be determined by assuming that arm 15 is withdrawn from cam 17 (by means of motion selector arm 20), and then determining the effect of the gear train interposed between sprocket assembly 11 and cam 17. Making this assumption, and recalling that the tooth ratio between pinion 13 and gear 12 is (in the present example) six-to-one, that cam 17 and pinion 13 are both fixed to drive shaft 80, that gear 12 is locked to input bevel gear 35 and that the differential assembly 10 does not multiply speed of rotation, it follows that output bevel gear 37, and thus sprocket wheels 66 and 68, rotates through an angle of 60° during each full clockwise rotation of shaft 80 and cam 17, and in the same direction, i.e., clockwise as seen from the sprocket assembly end of the illustrated embodiment. As explained above, however, sprocket assembly 11 is a six-frame sprocket assembly and thus 60° of rotation of sprocket assembly 11 advances film 26 by one full frame.

Thus, since sprocket assembly 11 undergoes a net advance of 60° during a single full rotation of cam 17, and since a 60° advance of sprocket assembly 11 advances film 26 by one frame, it follows that film 26 undergoes a net advance of one frame during each full rotation of cam 17.

It also follows that the full 360° contour of cam 17 must be divided into two sectors, an advance period section "A" occupying one-quarter of 360°, or 90°5 of the total contour, and a dwell period section "D" occupying three-quarters, or 270°, of the total 360° contour, in order to satisfy the abovesaid design criteria (a) and (b).

Proceeding to consideration of the contour of the D sector, or dwell period sector, of cam 17, it will be realized that the contour of this sector is determined by the fact that film 26 must be made to dwell during this period. When film 26 dwells, the speed of rotation of output bevel gear 37 must be zero. Thus, setting $X_{37}$ equal to zero in formula (2), and solving for $X_{36}$, it follows that:

$$X_{36} = X_{35}/2 \qquad (3)$$

Stated in words, intermediate gear 36 must be revolved about shaft 38 at one-half the speed of rotation on input bevel gear 35 in order to hold output bevel gear 37 in a nonrotating state. Thus, the contour of the D sector of cam 17 must be such as to rotate input arm 15, and intermediate gear carrier 56, about shaft 38 at precisely one-half the speed of rotation of input bevel gear 35, and in the same direction. To do this, the contour of the D sector of cam 17 is a segment of an Archimedian spiral coaxial with shaft 80, having its maximum radius at the 90° line shown on cam 17 in FIG. 2, and its minimum radius at the 0° line. Said maximum radius and minimum radius will be determined by the angle through which arm 15 must be turned to bring about a full one-frame advance of film 26 in one-quarter revolution of cam 17, hereinafter shown to be 22½°.

Given the contour of sector D, the contour of sector A of cam 17 may be selected by the designer of a particular embodiment of the invention to provide optimum kinematic characteristics of the film advance motion. For example, in the illustrated embodiment the contour of sector A was chosen as an essentialy sinusoidal curve, developed on a circular arc, thereby imparting desirable harmonic properties to the film advance motion. The amount of dwell may, of course, be greater or less than 270°, with a corresponding change in advance time.

Having explained the derivation of the contour of cam 17 of the illustrated embodiment, the cooperation of cam 17 and differential gear assembly 10 may now be understood, and will be described in detail. As explained hereinabove, a net rotation of 60° is imparted to sprocket assembly 11 during each full rotation of drive shaft 80 by reason of the six-to-one tooth ratio of gear 12 and pinion 13. This 60° rotation of sprocket assembly 11 corresponds to an advance of one frame of film 26. To satisfy the stated design criteria, however, the entire advancement of film 26 must take place during the first quarter of each full rotation of drive shaft 80, i.e., during the advance period section A of cam 17. That is to say, sprocket assembly 11 must be rotated a full 60° in the direction of advance during the first quarter of a full rotation of cam 17. During the first quarter of rotation of cam 17, however, input bevel gear 35 rotates through only 25 percent of 60°, or 15°. Thus, deducting this 15° advance from the full 60° advance desired in the first quarter rotation of cam 17, it follows that an additional 45° of rotation must be supplied to sprocket assembly 11 during the first quarter rotation of cam 17 by means of intermediate gear 36, intermediate gear carrier 56, arm 15, etc. The angular amount by which arm 15 must be rocked about shaft 38 in order to provide this additional 45° of rotation to sprocket assembly 11 may be determined from formula (2), realizing that formula (2 ) may be rewritten as:

$$R_{37} = 2R_{36} - R_{35}$$

(4)

where $R_{37}$ is the amount of rotation of output bevel gear 37 corresponding to a rotation $R_{35}$ of input bevel gear 35 and a revolution $R_{36}$ of intermediate gear 36 about shaft 38. Substituting 15° for $R_{35}$, and 60° for $R_{37}$, in formula (4), and solving for $R_{36}$, it may be seen that intermediate gear 36 must be revolved about shaft 38 through 22½°, i.e., input arm must be deflected through 22½°, to add the desired 45° of rotation to the 15° of net rotation imparted to sprocket assembly 11 by input bevel gear 35 during the first quarter rotation of cam 17. To accomplish this, the maximum and minimum radius of section A, which are also the maximum and minimum radius of sector D are so selected that, when wheel 91 is moved through a distance equal to their difference, arm 15 is deflected by 22½°. Such selection of the maximum and minimum radius of the contours of sectors A and D, that is, the maximum and minimum radius of cam 17, and all points therebetween may be computed mathematically according to the selected dwell-advance ratio.

Since cam 17 of the illustrated embodiment is contoured to provide the necessary 22½° deflection of arm 15 in the first quarter rotation of cam 17 (sector A), it follows that cam 17 cooperates with differential gear assembly 10 to advance sprocket assembly 11 by a full 60 degrees during the first quarter cycle of rotation of cam 17, thereby advancing film 26 by a full frame during the first quarter cycle of rotation of cam 17. Thereafter, for the remaining three-quarters of a full rotation of cam 17, the contour of sector D of cam 17, cooperating with wheel 91 and arm 15, will cause film 26 to dwell, until the beginning of the next rotation of cam 17, starting at the 0° mark shown on cam 17 in FIG. 2.

From the above, it may be seen that cam 17 and differential gear assembly 10 cooperate efficiently in the illustrated embodiment to cause film 26 to advance rapidly, but without violent, sprocket hole-tearing accelerations, during the first quarter rotation of cam 17, and to cause film 26 to dwell during the remaining three-quarters of each rotation of cam 17.

As explained previously, motion selector arm 20 may be used to withdraw arm 15, and wheel 91, from cam 17, thereby canceling the alternating increments of rotational speed supplied to differential gear assembly 10 by cam 17, and causing sprocket assembly 11 to rotate continuously, driving film 26 in continuous forward motion. When motion selector arm 20 is so actuated as to withdraw input arm 15, and wheel 91, from cam 17, the speed of drive means 14 may be increased to bring about more rapid winding of film 26, drive means 14 may be reversed and its speed increased, thereby rapidly rewinding film 26. However, as explained hereinbefore, the illustrated embodiment is capable of selective rewinding motion only when further means, indicated hereinabove, are provided. Such "further means" are shown and described in the second embodiment of the invention.

As will be clear from FIG. 6, film 26 may also be framed by rotating film drive 10, including housing 28, with respect to the housing of the cinematographic apparatus employing the invention. When this is done, it will not be necessary to provide the frame adjusting means including pin 23, slots 24, 25, etc. However, as discussed relative to the second embodiment of the invention, means must be provided to maintain the proper phase relationship with the shutter S.

DETAILED DESCRIPTION OF THE SECOND EMBODIMENT (FIGS. 7-15)

Referring to FIG. 7, there is schematically represented a motion picture projector which incorporates a film drive constructed in accordance with the second embodiment of the invention. The illustrated projector comprises first and second housings 160 and 161, supply reel 162, feed sprocket 163, and take-up sprocket 164, such sprockets being adapted to feed film from the reel 162 to a take-up reel, not shown. A light source 166 and condensing lens means 167 effect transmission of light through the aperture or gate 168 (FIG. 8) and thus through the portion of film 147 which is present at such aperture. The film is guided by side guide roller 169 and passes through the "film trap," the latter being formed by the pressure plate 171 which is associated with suitable spring means, not shown. A knob 172 is adapted to effect opening of the film trap in order to permit threading of the film. The projection lens is indicated at 173.

The intermittent sprocket is shown at 175 in FIGS. 7 and 8, and corresponds to the one described relative to the reference numeral 71, etc., in the previous embodiment. A bearing support for the shaft on which sprocket 175 is mounted is indicated at 176 in FIG. 7, and one such bearing is shown at 177 in FIG. 8.

The housing or casing of the present film drive is generally cylindrical and is shown at 178 in FIGS. 7 and 8. An electric motor or other drive means 179 is shown schematically in FIG. 7 and is connected through shaft (or other) means 180 and 182 to the film drive. The same motor 179 operates through shaft (or other) means 180 and 183 to drive the shutter 184 which is shown as disposed between housings 160 and 161. The shutter may be, for example, a conventional butterfly-shaped plate having alternate 90° sections which are respectively open (light-transmissive) and closed (opaque).

Referring particularly to FIGS. 8–10, inclusive, a hollow cylindrical mounting sleeve 186 is rigidly connected to housing 161 (or other fixed support) by suitable means, not shown. Thus, such sleeve 186 is stationary. A clamp ring 187 (FIG. 8) is mounted adjacent sleeve 186 and is connected thereto by a pin 188, so that rotation of the clamp ring is prevented. At a point diametrically opposite pin 188, the clamp ring is formed with ears 189 and a clamping fastener 191, similarly to the construction described relative to reference numerals 136–138 (FIG. 2A) in the previous embodiment.

The cylindrical housing or casing 178 is mounted within the sleeve 186 and clamp ring 187, the relationship being such that housing 178 may be rotated about its axis when clamp ring 187 is loose, and may not be rotated when clamp ring 187 is tightened. Such tightening and loosening may be effected by suitable means, not shown, which are connected to fastener 191 and may be operated from the exterior of housing 161.

The housing 178 is illustrated to comprise a generally cup-shaped body portion 192 and a cover plate 193. Elements 192–193 are secured together by suitable means, not shown, and define a chamber 194 which is maintained partially filled with oil.

A drive shaft 196 is journaled by means of bearings 197 and 198 in the housing 178, and in spaced-parallel relationship relative to the axis of such housing. Fixedly mounted on the left end of shaft 196 (FIG. 8) is a pinion 199 adapted to be driven by differential means next to be described, and which may be termed the drive differential. Also mounted in fixed relationship on the left end of the shaft is a fly wheel 201 having an annular groove 202 therein, the latter providing clearance space relative to a portion of the drive differential.

The drive differential has a cylindrical housing 203 on which is coaxially and fixedly mounted a cage gear 204 which meshes with pinion 199 to drive the same. The output gear of the drive differential is coaxial thereof and is shown at 206, whereas the input of such differential is illustrated as a coaxial pulley 207 driven by a belt 208. Pulley 207 is part of the drive means 180 and 182 which is schematically represented in FIG. 7 as connecting the film drive with motor 179.

The central shaft of the drive differential is fixedly secured to the housing 178 and remains fixed in space except when housing 178 is rotated to effect a framing adjustment as described subsequently.

The drive differential may be an epicyclic train of various conventional types, and incorporating planet gear means (not shown) disposed within housing 203.

As stated hereinafter, the output gear 206 is maintained stationary except during framing adjustment, so that driving of pulley 207 by belt 208 causes the housing or cage 203 of the differential to rotate about its axis. Cage gear 204 therefore drives pinion 199 to effect rotation of input shaft 196. Such shaft then drives the second or intermittent differential which is disposed in chamber 194 and corresponds to the one described relative to the first embodiment. The intermittent differential is an epicyclic train of gears or the like, as described below.

To operate the intermittent differential, a second pinion 211 is fixedly mounted on shaft 196 and within chamber 194, such pinion meshing with a spur gear 212 which is rigidly locked to the input bevel gear 213 of the intermittent differential. The input bevel gear is therefore rotated, and meshes with a planet bevel gear 214 which is rotatably mounted on a planet gear carrier 216.

Planet gear 214 also meshes with an output bevel gear 217 which is locked to an output shaft 218. Shaft 218 is journaled in housing cover 193, at a bearing 219, and is also journaled in the previously-indicated bearing 177. The output shaft 218 carries the sprocket element 175 which drives the film.

The inner end of shaft 218 is bored to receive the end of a shaft 221 which rotatably supports in coaxial relationship the input and output bevel gears 213 and 217 and also the gear carrier 216. The remaining end of the shaft 221 is disposed in a bore in the body portion 192 of the housing 178. Shafts 218 and 221 are coaxial with housing 178.

THE FRAMING MEANS, EMBODIMENT OF FIGS. 7–15

A bracket 222 (FIG. 8) is rigidly secured to a suitable fixed support such as a wall of housing 161. Rotatably mounted on the bracket 222 and coaxially of each other are first and second gears 223 and 224. Such gears are locked to each other, therefore one cannot rotate unless the other rotates through the same angle.

The first gear 223 is meshed with output gear 206 of the drive differential. The second gear 224 is meshed with a gear or gear segment 225 which, in turn, is fixed to body 192 of housing 178 in coaxial relationship relative to shafts 218 and 221.

An additional gear or gear segment, in the form of a curved rack and also coaxial with shafts 218 and 221, is indicated at 226 in FIGS. 7 and 8 and is fixedly secured (as by screws) to the housing cover 193. A pinion 227, meshed with gear 226, is operated by turning of a knob 228 (FIG. 8). The knob is mounted on a suitable shaft 229 which is suitably journaled by means, not shown.

A framing adjustment may be made when the film drive is operating at full speed or any other speed. For purposes or simplicity of description, it will be assumed that motor 179 and thus the film drive are stopped, pulley 207 of the drive differential then being locked by motor 179 and therefore stationary.

To make a framing adjustment, the operator first loosens fastener 191 to permit ears 189 of clamp ring 187 to spread, which releases the housing 178 for rotation within the stationary sleeve 186. The operator then rotates knob 228 to effect, through pinion 227 and rack 226, rotation of housing 178 about its axis. Because of the described gear relationships, and the fact that pulley 207 is locked, such rotation of housing 178 effects a corresponding rotation of shaft 218 and thus of sprocket 175. The position of film 147 is thus adjusted relative to aperture 168 until correct framing is achieved.

When housing 178 thus rotates through the necessary angle (usually a relatively small one), the gear or gear segment 225 on housing 178 causes rotation of the gear 224 which is supported in bracket 222. This, in turn, effects corresponding rotation of gear 223 to cause the same to rotate in planetary manner around gear 206. Consequently, gears 206 and 204 (and also pulley 207) remain stationary.

Stated otherwise, the number of teeth on the various gears are such that the described framing adjustment does not cause any movement of gears 199 and 204 relative to each other, or of the cam means (or the shaft 196) relative to the associated cam followers. Such cam means, described below, correspond to cam 17 of the previous embodiment. Accordingly, the described rotation of sprocket 175 to effect framing does not change the time when shifting or feeding of film 147 occurs. Since the time when film 147 is shifted relative to aperture 168 does not change, and since shutter 184 is stationary (being locked to the stationary motor 179), it follows that the proper relationship between shutter and film movement is not disturbed.

It is emphasized that a solid (opaque) portion of the shutter 184 must always be in front of the aperture or gate 168 during periods when the film is being moved. The above-described mechanism correlates the intermittent differential (including the cam means which drives one of its inputs) to the shutter in such manner that, despite the framing adjustment, the proper phase relationship always exists.

After the framing adjustment is completed, the operator tightens the fastener means 191 to thereby effect locking of clamp ring 187 and consequent fixing of the position 178. Such locking is very positive and is not subject to creep, despite any vibration which may be present.

Because housing 178 is thus locked, gear 225 and thus gears 224 and 223 are also locked to thereby lock gear 206 of the drive differential. Since such gear 206 is locked, operation of the input pulley 207 by belt 208 can effect (through cage gear 204) rotation of pinion 199 and shaft 196 as previously stated.

THE POSITIVE-ACTION CAM MEANS

Figure 13:
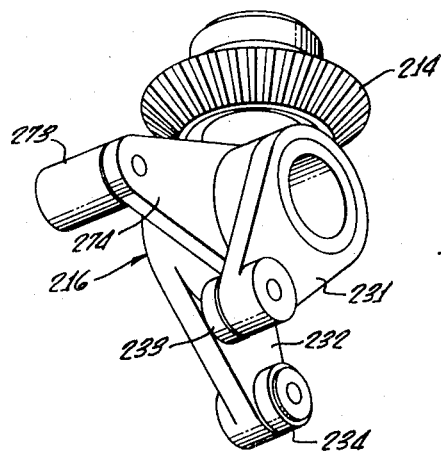
FIG. 13 is an isometric view of the planet gear and associated cam follower elements.

Referring particularly to FIGS. 8, 10 and 13, the planet gear carrier 216 is formed with two cam-follower arms 231 and 232 having roller-type cam followers 233 and 234, respectively, mounted thereon.

A first cam 236 is fixedly secured to the drive shaft 196, as by the pin shown at 238 in FIG. 8. During the cine or intermittent mode of operation, the periphery of cam 236 is in constant engagement with the cam follower roller 234.

A second cam 239 having a large hub 240 is movably mounted on the drive shaft 196. A pin 241 (FIG. 8) or other suitable element is provided to prevent rotation of the cam 239 on shaft 196 but to permit longitudinal shifting of the cam along such shaft. The pin 241 is connected to or integral with fixed cam 236, and extends slidably through an opening in longitudinally movable cam 239, thus effecting rotation of the cam 239 with cam 236 while still permitting relative axial movement of the cam 239. The means to effect such longitudinal shifting of cam 239, and to determine the longitudinal position thereof on the shaft 196, will be described hereinafter.

The periphery of cam 239 is, when the mechanism is operating in the cine or intermittent mode, in engagement with roller 233 on arm 231 of the planet gear carrier. This relationship is best illustrated in FIG. 10, which figure also illustrates that the two cams 236 and 239 are conjugate or complementary to each other, so that the edge of each always stays in engagement with the associated roller 234 or 233 when the mechanism is operating in the cine mode.

A positive cam action is thereby achieved whereby the motion picture projector may be operated in both the forward and reverse directions and still be in the intermittent mode when desired. Furthermore, there is no need for any spring means such as the spring 92 (FIG. 2) of the previous embodiment.

The conjugate or complementary cams 236 and 239 are so shaped that the output shaft 218 (and thus intermittent-drive sprocket 175) are stationary 75 percent of the time and in motion 25 percent of the time. The considerations necessary to achieve this result, and to achieve smooth movement of the shaft, were discussed in detail relative to the previous embodiment and apply equally well to the present embodiment.

LOCKING MECHANISM TO ACHIEVE COMPLETELY JITTER-FREE STOPPING OF OUTPUT SHAFT 218 AND THUS SPROCKET 175 DURING EACH DWELL PERIOD

The mechanism to insure that the shaft 218 and thus sprocket 175 are absolutely stationary during dwell periods comprises a locking disc 242 (FIGS. 8 and 9) which is fixedly secured to the output bevel gear 217 as by screws 243. A plurality of notches 244 are formed in the periphery of disc 242 and in equally circumferentially-spaced relationship relative to each other. The disc edge portions adjacent the notches may be slightly beveled, such as a few thousanths of an inch.

Five of the notches 244 are shown in FIG. 9, this being because the illustrated form of the second embodiment incorporates a gear ratio of five to one between gear 212 and pinion 211. For such a relationship, the sprocket 175 is caused to be a five-frame sprocket. This is to be contrasted with the six-frame sprocket assembly and six-to-one gear ratio described relative to the first embodiment. It is emphasized, however, that different numbers of frames and correspondingly different gear ratios may be provided as desired.

Referring particularly to FIG. 9, there is illustrated a register or locking pin element having diametrically opposed portions 246 and 247 which are connected to each other by a generally annular body 248. Portions 246 and 247 are slidably mounted in corresponding slots in a housing 251, the relationship being such that vertical reciprocation of the register pin element will cause the upper register or locking pin portion 246 to enter one of the notches 244 as described below. The housing 251 defines a chamber sufficiently large to permit upward and downward shifting of the annular body 248 in order to permit such vertical movement of the register pin portions.

Housing 251 prevents movement of pin portion 246 in the direction of rotation of disc 242. Thus, such disc and the connected shaft and sprocket cannot rotate when pin portion 246 is in one of notches 244.

An eccentric cam 252 is formed integrally on the hub portion 240 of the movable cam 239, and extends through the annular body 248. Thus, rotation of such eccentric cam will operate to reciprocate vertically the body 248 and register pin portions 246 and 247. It is to be remembered that the movable cam 239 is rotated by pin 241 from fixed cam 236, so that this rotation is imparted to the eccentric cam 252 to thereby effect the register pin reciprocation.

The eccentric cam 252 has such an angular orientation relative to cams 239 and 236 that the register or locking pin portion 246 will be received within a notch 244 of locking disc 242 during substantially the entire 270° rotation of input shaft 196 (during which 270° rotation the output or sprocket shaft 218 is stationary). Conversely, during the 90° period when the sprocket shaft is being rotated, the register pin portion 246 is disengaged from the slot and therefore such rotation is permitted.

It is important to note that no shock is absorbed by the register pin portion 246 since the mechanical properties of the differential cancel the motion of shaft 218. Accordingly, the function of the register pin portion is to assure that no vibrations or "jitter," due to slight inaccuracies in the differential gear train under dynamic conditions, will be transmitted to the sprocket or output shaft 218.

MECHANISM FOR CONVERTING FROM INTERMITTENT OR CINE MODE TO CONTINUOUS OR SLEW MODE (EMBODIMENT OF FIGS. 7–15)

A split disc 253 (FIG. 8) is provided in an annular groove in cam hub 240 in order to lock the housing 251 against shifting relative to such hub. A plurality of circumferentially-spaced screws 254 (FIG. 9) are extended through the housing 251 and are received in tapped holes in the split disc 253, thus maintaining the parts in assembled relationship without preventing reciprocation of register or locking pin portions 246 and 247 or of the annular body 248. More specifically, the screws 254 extend through a removable cover portion of the housing 251 (which cover is shown at the right in FIG. 8), and then extend through the body of the housing 251 and into the above-indicated tapped holes in split disc 253.

Figure 12:
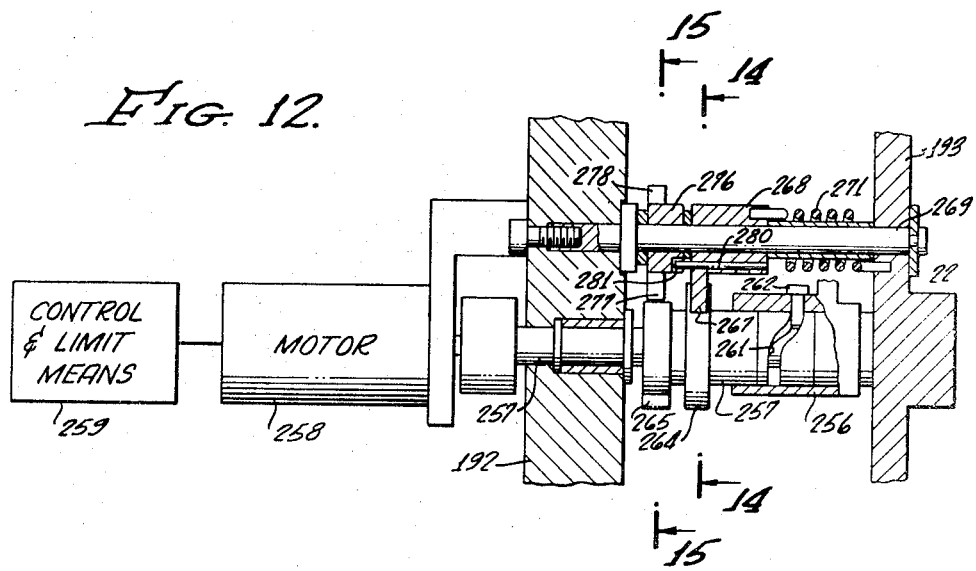
FIG. 12 is a fragmentary sectional view taken along line 12—12 indicated in FIG. 10.

Formed integrally with the body of housing 251 is an arm or crank 255 (FIG. 9) the outer end of which is integral with a tubular sleeve 256 as best shown in FIG. 12 (FIG. 12 being a section generally on line 12—12 of FIG. 10). Sleeve 256, in turn, is mounted slidably around a mode-change shaft 257 which extends between the cover 193 and body 192 of housing 178, in parallel relationship to shafts 196 and 221.

The mode-change shaft 257 is connected to be driven by a suitable actuating means such as the electric motor schematically represented at 258 in FIG. 12. Control and limit means 259 (which may include limit switches associated with cams on shaft 257) are suitably associated with motor 258 and with shaft 257 to insure that during each actuation of the mode-change means the shaft 257 will rotate through the angle necessary to shift from cine to slew mode, or from slew to cine mode. As indicated hereinafter, this amount of rotation of the shaft 257 is approximately 180°.

Again referring to FIG. 12, the portion of shaft 257 within sleeve 256 has formed therein a closed (endless) cam groove 261 into which is extended a cam-follower pin 262, the latter being mounted rigidly in the sleeve 256. Groove 261 is so shaped that rotation of shaft 257 through approximately 180° will cause the sleeve 256 to shift axially through a predetermined distance in one direction on shaft 257. Conversely, continued rotation of shaft 256 through the second 180° and in the same direction will cause (through operation of groove 261 and pin 262) the sleeve 256 to shift back to its original position. However, as discussed below, the full 180° is not required for axial shifting in either direction, a major part of each 180° representing a dwell period of pin 262.

The "predetermined distance" is so selected that arm 255 will (assuming the parts are originally in their position effecting the intermittent or cine mode) cause housing 251, register or locking elements 246–248 and the longitudinally movable cam 239 to shift sufficiently far from the position shown in FIG. 8 that:

a. Register or locking pin portion 246 will no longer be radially adjacent any notch 244 or any portion of the periphery of locking disc 242, and b. Cam 239 will no longer be radially adjacent the associated cam follower 233, and therefore cannot engage such cam follower.

Figure 11:
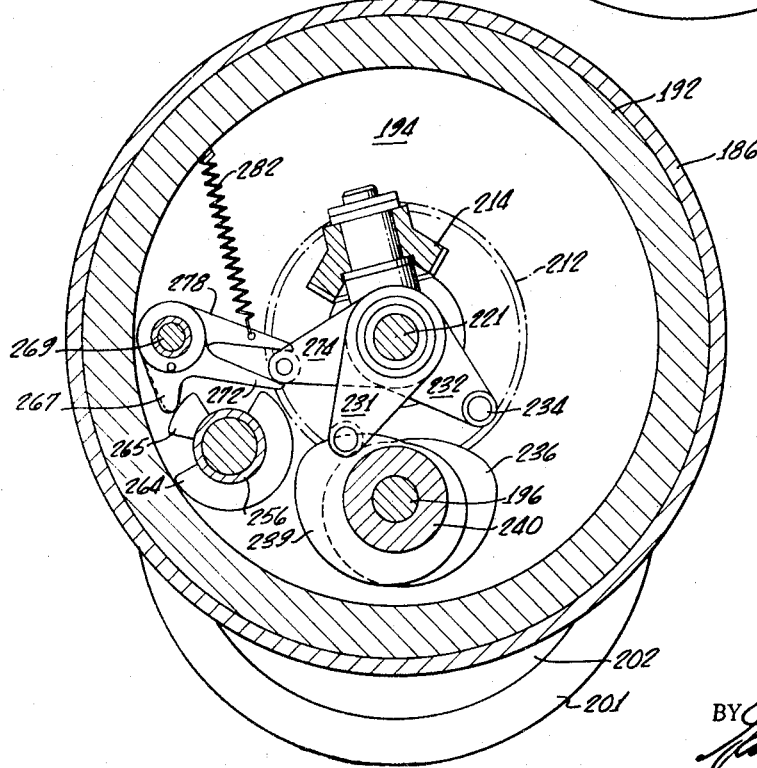
FIG. 11 is a view corresponding to FIG. 10 but illustrating the components in a different position, namely, one during which continuous or slew operation is taking place instead of the cine or intermittent operation represented by FIG. 10.

It follows that the planet gear carrier 216 may then be tilted or pivoted from the FIG. 10 position to the FIG. 11 position. When carrier 216 is in the FIG. 11 position, roller 234 is radially spaced from the fixed cam 236 sufficiently far that there can be not contact therebetween. Accordingly, and since roller 233 is then spaced axially away from the cam 239 and therefore can no longer engage the same regardless of the rotated position of the cam, the cams 236 and 239 are both out of contact with their associated cam follower rollers so that the mechanism is no longer operating in the cine or intermittent mode. It also follows that the register pin element 246 cannot interfere with the free rotation of locking disc 242 in a continuous manner.

Proceeding next to a description of the means for tilting the planet gear carrier 216 from the FIG. 10 position to the FIG. 11 position in order to achieve the above-described effects, first and second cams 264 and 265 are mounted fixedly on the mode-change shaft 257 in axially spaced relationship relative to each other, the cam 264 being closer to cover 193 (as shown in FIG. 12).

Cam 264 is adapted to engage a lobe 267 on a sleeve 268 (FIG. 14) which is rotatably mounted on a crank-mounting shaft 269. Such shaft 269 extends (FIG. 12) between the bottom of housing element 192 and the cover plate 193, in parallel relationship to shaft 257. A helical torsion spring 271 is mounted around shaft 269, and connected between cover 193 and sleeve 268, the relationship being such that sleeve 268 is constantly urged counterclockwise (as viewed in FIGS. 9–11 and 14) to the maximum extent permitted by the cam 264.

Cam 264 thus determines the rotated position of sleeve 268 on shaft 269, by engaging the lobe 267. Also, as described below, such rotated position may be determined by a lost-motion connection including a pin and a notch.

Formed integrally with sleeve 268 is a lower crank 272 which extends toward shaft 221. Crank 272 is disposed below a roller 273 (FIG. 13) on a crank 274 which is formed integrally with the gear carrier 216.

A second sleeve 276 is mounted rotatably on crank-mounting shaft 269 and is integral with a lobe 277 and a crank 278 (FIG. 15). Lobe 277 is disposed to be operated by the cam 265 on mode-change shaft 257. The crank 278 is disposed above the roller 273 on the gear-carrier crank 274.

A pin 280 is mounted fixedly in sleeve 268 (FIG. 12) and extends into an elongated notch 281 formed in the sleeve 276 for crank 278. A tension spring 282 is connected between crank 278 and housing portion 192, and maintains crank 278 in the uppermost position permitted by the associated pin 280 and cam 265. Pin 280 and notch 281 form the above-mentioned lost-motion connection.

The cranks 272 and 278 are operated by the associated cam, spring and pin elements in such manner as to engage roller 273 on crank 274 and thus pivot the gear carrier 216 counterclockwise from the FIG. 10 position to the FIG. 11 position, thus changing the apparatus from the intermittent or cine mode to the continuous or slew mode. However, as indicated above, this cannot occur until after the cam 239 and associated locking element have been shifted to the left (FIG. 8) until the locking disc 242 cannot be engaged and also until the roller 233 cannot engage the movable cam 239. The operation is then reversed is order to cause the film drive to revert back to the intermittent mode. All of this is accomplished in response to rotation of mode-change shaft 257 by motor 258 under the control of means 259. A detailed description of the mode change will now by given.

Referring particularly to FIGS. 14 and 15, there will next be described the manner of shifting from cine (intermittent) operation to slew (continuous) operation and then reversing the process.

Figure 14A:
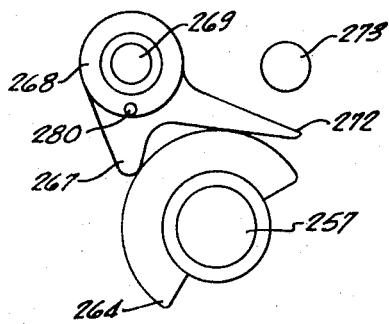
FIGS. 14a, 14b and 14c are schematic vews generally at the location indicated at 14—14 of FIG. 12, and showing components in three different positions.
Figure 15A:
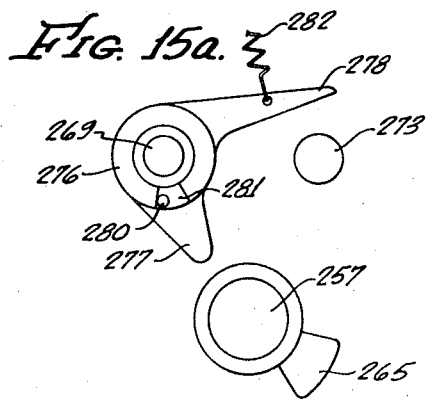
FIGS. 15a, 15b and 15c are corresponding schematic views taken generally at the location indicated at 15—15 of FIG. 12.

FIGS. 14a and 15a correspond to each other and show (as does FIG. 10) the positions of the parts when the mechanism is in the cine mode of operation. Cranks 272 and 278 are then spaced apart sufficiently far to permit upward and downward movement of roller 273 on arm 274 in response to operation of the conjugate cams 236 and 239. At this time, the longitudinally-movable cam 239 is in the axial position shown in FIG. 8, and is in engagement with its cam follower roller 233. Furthermore, the register or locking pin portion 246 is radially adjacent locking disc 242, so that locking may occur as stated above. The mode-change shaft 257 is then in the position shown in FIG. 12.

When the parts are in the positions of FIGS. 14a and 15a, cam 264 prevents counterclockwise rotation of crank 272 (FIG. 14a) about its shaft 269, despite the pressure exerted by torsion spring 271 (FIG. 12), due to the engagement of lobe 267 with the periphery of cam 264. Correspondingly, counterclockwise rotation of crank 278 (FIG. 15a) in response to the tension of spring 282 is prevented due to the fact that pin 280 (FIG. 12) is then engaged by one end wall of notch 281.

When it is desired to shift from cine to slew mode, control and limit means 259 (FIG. 12) are operated in such manner that motor 258 is started and effects a substantially 180° rotation of mode-change shaft 257 (FIG. 12), following which the motor stops. The direction of such rotation is counterclockwise as viewed in FIGS. 14 and 15. The parts then shift from the positions of FIGS. 14a and 15a to the positions of FIGS. 14b and 15b (the latter two figures also corresponding to each other).

During the initial part of such 180° rotation of mode-change shaft 257, the cooperation between cam groove 261 and cam-follower pin 262 causes (due to the shape of the cam groove) sleeve 256 and thus arm 255 and housing 251 (FIG. 9) to shift to the left (FIGS. 8 and 12) until register pin portion 246 is no longer registered with locking disc 242, and until cam follower roller 233 is no longer in position to be engaged by longitudinally movable cam 239.

Figure 15B:
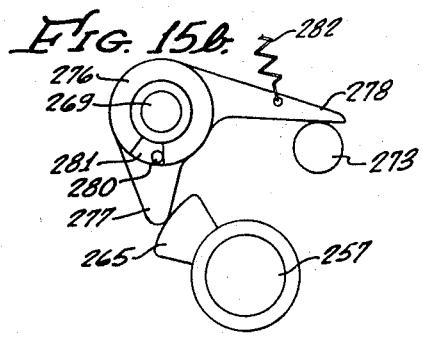

Cam 265 then engages lobe 277 and causes downward (clockwise) pivoting of crank 278 (against the tension of spring 282) from the position of FIG. 15a to the position of FIG. 15b. This causes the crank 278 to engage roller 273 and shift the same downwardly to pivot the planet gear carrier 216 counterclockwise from the position of FIG. 10 to the position of FIG. 11 as described above.

Figure 14B:
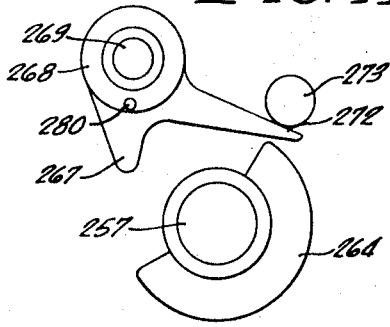

In changing from the position of FIG. 14a to the position of FIG. 14b, cam 264 disengages lobe 267. Such lobe 267 and its associated crank 272 are shifted clockwise, despite the action of torsion spring 271 (FIG. 12), due to the fact that pin 280 is then engaged and shifted by the other end wall of notch 281 (as shown in FIG. 15b). Crank 272 thus moves downwardly sufficiently far to provide clearance for roller 273, so that such roller can be moved far enough (by crank 278) to pivot the gear carrier 216 to the slew position of FIG. 11.

The roller 273 is then locked between cranks 278 and 272, FIG. 11, so that the planet gear carrier 216 is maintained stationary. Therefore, there is only one input to the intermittent differential, such input being the constant speed drive for shaft 196. The output or sprocket shaft 218 and the sprocket 175 therefore rotate at a constant speed.

Figure 14C:
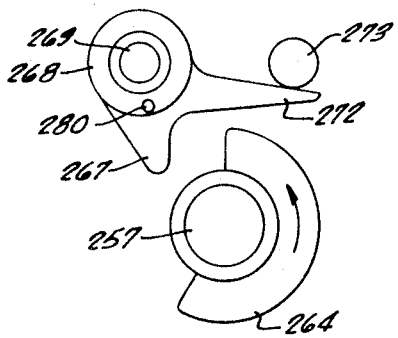
Figure 15C:
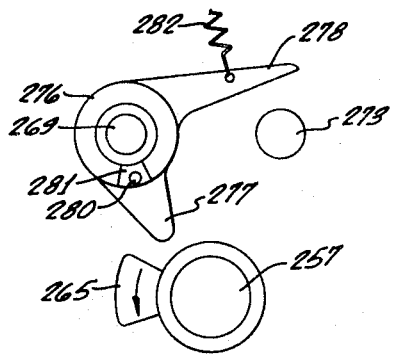

When it is desired to revert to the cine mode, the control and limit means 259 are actuated to cause operation of motor 258 in a manner rotating shaft 257 an additional 180° in the same (counterclockwise) direction as before, and back to the positions of FIGS. 14a and 15a. FIGS. 14c and 15c illustrate intermediate positions which occur while the shaft 257 is actually rotating, such intermediate position being one which occurs after the cams have rotated only relatively short distances.

As soon as the shaft 257 has rotated until the position of FIGS. 14c and 15c is achieved, cam 265 (FIG. 15c) disengages lobe 277. This permits the tension spring 282 to pivot crank 278 counterclockwise or upwardly. The end of notch 281 therefore no longer serves as a stop for pin 280. Thus, and since lobe 267 (FIG. 14c) is not then engaged, the torsion spring 271 (FIG. 12) shifts crank 272 upwardly to elevate roller 273 on the arm 274 of planet gear carrier 216, thus shifting the planet gear carrier back to the cine position of FIG. 10. Shortly thereafter, the cam 264 engages lobe 267 and effects clockwise pivoting of such lobe (against the bias of spring 271) and the associated crank 272 until the position of FIG. 14a is achieved. The cranks 272 and 278 are then both spaced from the roller 273 and permit such roller to reciprocate back and forth as an incident to operation of the planet gear carrier by the conjugate cams 236 and 239.

The above-described movements occur during a dwell period of cam slot 261 and pin 262 (FIG. 12). After the position of FIGS. 14c and 15c has been achieved, and also after cam 264 has engaged lobe 267 and pivoted crank 272 downwardly, the cam slot and pin mechanism 261 and 262 operate to shift sleeve 256, arm 255, housing 251 (FIG. 9) and the associated cam and locking pin mechanism back to the position of FIG. 8. The mechanism is then back in the cine or intermittent mode, and motor 258 is shut off by the control means 259.

When the planet gear carrier is pivoted clockwise from the FIG. 11 position to FIG. 10 position, roller 234 drops onto the edge of fixed cam 236. This automatically orients the longitudinally-movable cam 239 in such manner that it may be shifted longitudinally beneath its cam follower 233—without engaging the side thereof. Register or locking pin portion 246 can never engage the side of disc 242, during shifting back to cine operation, because the pin portion is either retracted or is registered with a notch 244.

It is desirable that the film drive mechanism be operated slowly during shifting from the slew mode to the cine mode, since this eliminates the necessity for use of a torsion spring 271 (FIG. 12) sufficiently large to pivot various elements (including sprocket 174) during lifting of roller 273 by crank 272.

As previously indicated, it is a major feature of the invention that the mode may be changed from cine to slew and then back to cine without at any time disturbing the framing adjustment (which framing adjustment may be effected when the mechanism is operating at full speed). This is because the input pinion 211 (FIG. 8) is fixedly associated with the input bevel gear of the intermittent differential mechanism (in chamber 194) at all times. Furthermore, there is a fixed angular relationship between the input bevel gear 213 and both of the cams 236 and 239 at all times when the mechanism is in the cine mode. Thus, any disengagement or reengagement of the cam follower rollers 233 and 234 from their associated cams has no effect on framing. After such rollers are re-engaged with their associated cams, the framing will necessarily be the same as it was prior to disengagement. Thus, shifting from slew and back to cine does not disturb the framing adjustment.

It is to be noted that, in the second embodiment wherein the locking means 242, 244, 246, etc., are present, the conjugate cams 236 and 239 may be greatly simplified. Because the output bevel gear 217 of the intermittent differential is locked, the swell (or Archimedian spiral) portion of each cam may be omitted. There therefore remain only the actuating portions of such cams (and appropriate lead-in portions), which effect the actual shifting of the film from frame to frame. There must be sufficient lead-in or dwell portion on each cam 236 and 239 to make sure that pin portion 246 enters a notch 244 (without shock or impact).

The foregoing detailed description is to be clearly understood as given by way of illustration and example only, the spirit and scope of this invention being limited solely by the appended claims.

I claim:

1. A motion picture projector, which comprises:
   means to define an aperture or gate,
   light source and lens means to project on a screen the image on the portion of a motion picture film which is registered with said aperture,
   intermittent feeding means to cause successive frames of said film to be generally registered with said aperture,
   said intermittent feeding means comprising an epicyclic train having two inputs and one output,
   said output being connected to drive means for said film,
   one of said inputs being connected to a constant speed motor means,
   said intermittent feeding means further comprising means to actuate the other of said inputs in such manner that said output is stationary during the major proportion of the time when each frame on said film is generally registered with said aperture, and
   means to effect framing of said film to bring each frame of said film into the precise desired registry with said aperture when said output is stationary.

2. The invention as claimed in claim 1, in which said projector further comprises a shutter, and in which said framing means is connected to said epicyclic train in such manner that an opaque portion of said shutter is always present at said aperture during periods when said film is being fed past said aperture.

3. The invention as claimed in claim 1, in which said epicyclic train is mounted in a movable housing, and in which said framing means comprises means to move said housing.

4. The invention as claimed in claim 3, in which means are provided to clamp said housing rigidly in any position to which it is moved by said framing means.

5. The invention as claimed in claim 1, in which said projector further comprises a shutter connected to said constant speed motor means, in which a second epicyclic train is interposed between said one input and said constant speed motor means, in which said first-mentioned epicyclic train is mounted in a housing, in which means are provided to mount said housing for rotation about a predetermined axis and in such manner that said rotation operates said output to effect a framing adjustment of said film relative to said aperture, in which means are provided to rotate said housing about said predetermined axis to thus effect framing, and in which means are provided to connect said housing to said second epicyclic train in such manner that said rotation of said housing does not disturb the relationship between said shutter and said output.

6. An epicyclic drive for a cinematographic apparatus, which comprises:
   an epicyclic train having two inputs and one output,
   connector means to connect said output to a motion picture film to drive the same,
   means to drive one of said inputs at a substantially constant speed,
   means to drive the other of said inputs in a reciprocating manner effecting intermittent movement of said output and thus of said film,
   said last-named drive means being such that said intermittent movement is characterized by relatively short periods of movement alternating with relatively long periods of dwell, and means additional to said epicyclic train to effect positive locking of said output and of said connector means during said periods of dwell.

7. The invention as claimed in claim 6, which said locking means comprises:
a locking element connected to said output and adapted to rotate therewith,
said locking element having notch means formed therein,
locking pin means adapted to be inserted snugly into said notch means,
reciprocation means to maintain said locking pin means in said notch means during each period of dwell of said output and thereafter withdraw said locking pin means from said notch means prior to the succeeding period of movement, and means to maintain said locking pin means against movement in the direction of rotation of said locking element while said locking pin means is disposed in said notch means.

8. The invention as claimed in claim 7, in which said locking element is a locking disc fixedly mounted on said output for rotation therewith, and in which said notch means comprises a plurality of notches circumferentially spaced about the periphery of said locking disc.

9. The invention as claimed in claim 7, in which said reciprocation means comprises cam means to reciprocate said locking pin means in timed relationship to the movements of said output.

10. The invention as claimed in claim 6, in which said epicyclic train is a bevel gear differential.

11. A motion picture projector, which comprises:
means to define an aperture or gate,
light source and lens means to project on a screen the frame of a motion picture film which is present at said aperture,
intermittent drive means to drive said film past said aperture in such manner that each frame of said film dwells, at a position adjacent said aperture, for a substantial period of time,
said intermittent drive means comprising an epicyclic train having two inputs and one output,
said output being connected to a film to drive the same,
one of said inputs being connected to a constant speed motor means,
the other of said inputs being connected to an actuating means so related to said epicyclic train and to said constant speed motor means that the motion of said output is characterized by said dwell periods,
framing means to adjust relative to the position of said aperture the position of each frame of said film during the dwell period thereof, and
means to disconnect said actuating means from said other input and to hold said other input substantially stationary, while maintaining the connection between said constant speed motor means and said one input,
whereby said film is driven in continuous or slew manner, and
whereby reconnection of said actuating means to said other input will effect resumption of intermittent drive without disturbing the precise framing adjustment effected by said framing means.

12. The invention as claimed in claim 11, in which said actuating means is a positive cam drive adapted to cause intermittent driving of said output in either forward or reverse direction.

13. The invention as claimed in claim 11, in which said epicyclic train is a bevel gear differential.

14. A motion picture projector capable of cine operation in the absence of jitter, and capable of slew operation without disturbing the framing adjustment, which comprises:
light source, lens and shutter means to effect projection on a screen of the image present on a motion picture film,
a bevel gear differential having coaxial input and output bevel bears both of which are meshed with a planet bevel gear,
said planet gear being rotatably mounted on a planet gear carrier which, in turn, is mounted for pivotal movement about the common axis of said input and output gears,
means to connect said output gear to said film to positively drive the same,
means to drive said input gear at a constant speed,
cam means to effect pivotal movement of said gear carrier about said axis in such manner that said output gear periodically comes to a stop to thus initiate a dwell period,
locking means to positively lock said output gear after the same comes to each of said stops, thereby eliminating jitter, and
mode-change means to disengage said locking means, to interrupt the drive of said gear carrier by said cam means, and to hold said gear carrier against rotation,
said last-named means being adapted to operate without interrupting driving of said input gear by said drive means therefore, whereby said film is driven in the slew mode.

15. The invention as claimed in claim 14, in which a film aperture or gate is provided for said film and in which framing means are associated with said differential to change with respect to said aperture the position of said film during each of said dwell periods, said framing means operating without disconnecting said drive means for said input gear and without distrubing the relationship between said differential and said shutter means.

16. The invention as claimed in claim 15, in which said differential is mounted in a housing, and in which said framing means comprises:
means to pivot about said common axis said housing of said differential,
a second differential interposed in the drive of said input gear, and
means to correlate the rotated position of said housing with the output of said second differential.

17. The invention as claimed in claim 14, in which a drive shaft is rotatably mounted in spaced and parallel relationship relative to said common axis, in which said means to drive said input gear includes gear means to connect said drive shaft to said input gear, in which said cam means includes first and second conjugate cams non-rotatably mounted on said drive shaft and respectively engaged with first and second cam followers on said gear carrier, and in which said locking means comprises a locking disc mounted coaxially on said output gear and having circumferentially spaced notches formed therein, said locking means further comprising a locking pin shaped for snug insertion into each of said notches and means on said drive shaft to reciprocate said pin into and out of said notches, said last-named means being so related to said cams that said pin is in one of said notches during substantially all of each dwell period of said output gear.

18. The invention as claimed in claim 17, in which said mode-change means comprises means to move one of said cams and also said locking pin longitudinally along said drive shaft until said one cam is out of engagement with the cam follower therefor, and until said pin is in a position where it can no longer engage any part of said locking disc, and in which said mode-change means further comprises said means to pivot said carrier until the cam follower for the other of said cams can no longer be engaged thereby.

19. The invention as claimed in claim 18, in which said mode-change means comprises a mode-change shaft parallel with said drive shaft, a crank-carrying shaft parallel to both said drive shaft and said mode-change shaft, means to drive said mode-change shaft, cam means to effect said longitudinal movement of said cam and said locking pin along said drive shaft and in response to rotation of said mode-change shaft, crank means on said crank-carrying shaft to engage a crank on said gear carrier and thereby effect said pivoting of said carrier, and cam means on said mode-change shaft to operate said crank means.

20. The invention as claimed in claim 19, in which spring bias means are provided to bias the cranks on said crank-carrying shaft in predetermined directions, and in which a lost-motion connection is provided between said cranks.

21. A motion picture projector, comprising:
light source, lens and shutter means to effect projection on a screen of the image present on a motion picture film,
a bevel gear differential having coaxial input and output bevel gears both of which are meshed with a planet bevel gear,
said planet gear being rotatably mounted on a planet gear carrier which, in turn, is mounted for pivotal movement about the common axis of said input and output gears,
means to connect said output gear to said film to positively drive the same,
means to drive said input gear at a constant speed,
cam means to effect pivotal movement of said gear carrier about said axis alternately in opposite directions and in such manner that said output gear moves intermittently,
the intermittent movement of said output gear being such that there are short periods of movement alternating with long periods of dwell, and
mode-change means to interrupt the drive of said gear carrier by said cam means, and to hold said gear carrier against rotation,
said last-named means being adapted to operate without interrupting driving of said input gear by said drive means therefor, whereby said film is driven in the slew mode.

22. The invention as claimed in claim 21, in which a drive shaft is rotatably mounted in spaced and parallel relationship relative to said common axis, in which said means to drive said input gear includes gear means to connect said drive shaft to said input gear, in which said cam means includes first and second conjugate cams non-rotatably mounted on said drive shaft and respectively engaged with first and second cam followers on said gear carrier.

23. The invention as claimed in claim 22, in which said mode-change means comprises means to move one of said cams longitudinally along said drive shaft until said one cam is out of engagement with the cam follower therefor, and further comprises means to pivot said carrier until the cam follower for the other of said cams can no longer be engaged thereby.

24. The invention as claimed in claim 23, in which said mode-change means comprises a mode-change shaft parallel with said drive shaft, a crank-carrying shaft parallel to both said drive shaft and said mode-change shaft, means to drive said mode-change shaft, cam means to effect said longitudinal movement of said cam along said drive shaft and in response to rotation of said mode-change shaft, crank means on said crank-carrying shaft to engage a crank on said gear carrier and thereby effect said pivoting of said carrier, and cam means on said mode-change shaft to operate said crank means.

25. A motion picture projector, which comprises:
light source and lens means to project on a screen the portion of a motion picture film present at an aperture, and
means to feed said film past said aperture in intermittent manner,
said feeding means comprising an epicyclic train the output of which is connected to said film to drive the same,
one input of said train being driven by a constant-speed motor means,
the other input of said train being driven by means so related to said train that said output periodically comes to halt to thereby permit said output to be locked and cause said film to dwell,
said feeding means further comprising means to lock said output to achieve jitter-free dwells thereof and of said film.

26. A cinematographic apparatus, which comprises:
lens means arranged in series relationship with an aperture, and
means to feed a film past said aperture in intermittent manner such that said film dwells during predetermined periods when light is passing through said aperture and through said lens means,
said feeding means comprising:
an epicyclic train one component of which is connected to said film,
means to drive said epicyclic train to cause intermittent film-advancing movements of said one component, and
means to lock said one component during dwell periods between said film-advancing movements thereof,
said lock means being independent of said drive means.

27. The invention as claimed in claim 26, in which said drive means brings said one component to a stop prior to locking of said one component by said lock means, and in which said lock means releases said one component prior to the next film-advancing movement thereof.

28. The invention as claimed in claim 27, in which said drive means for said epicyclic train means to effect constant-speed rotation of another component of said epicyclic train, and also comprises means to effect such movement of a third component of said epicyclic train that said one component thereof first moves to cause a film-advancing movement of said film, and then stops to condition said one component for locking by said lock means.

29. The invention as claimed in claim 28, in which mode-shift means are provided to maintain said lock means disengaged from said one component, and to maintain said third component locked, whereby said one component and thus said film are driven in continuous or slew mode.

30. The invention as claimed in claim 29, in which framing means are provided to position said film relative to said aperture during dwell periods of said film, and in which said mode-shift means are so related to said framing means that the setting of the latter is not affected by a shift to or from slew mode.

31. The invention as claimed in claim 26, in which said epicyclic train is a differential.

32. A motion picture projector, which comprises:
means to define an aperture or gate,
light source and lens means to project on a screen whichever frame of a motion picture is stopped at said aperture,
intermittent drive means to drive said film past said aperture in such manner that each frame of said film stops at a position adjacent said aperture,
said intermittent drive means comprising a differential having two inputs and one output,
said output being connected to said film to drive the same,
one of said inputs being connected to a constant speed motor means,
the other of said inputs being connected to an actuating means so related to said differential and to said constant speed motor means that said output is characterized by periods of movement followed by stops,
framing means to adjust relative to the position of said aperture the position of each frame of said film while such frame is stopped, and
lock means independent of said constant speed motor means and of said actuating means,
said lock means being adapted to lock said output shortly after the same has come to each of said stops, and to release said output a substantial time period later and prior to the next movement of said output, whereby said output and thus said film are effectively caused to dwell in jitter-free manner between periods of movement of said film.

33. The invention as claimed in claim 32, in which means are provided to release said lock means, to disconnect said actuating means from said other input and to hold said other input substantially stationary, while maintaining the connection between said constant speed motor means and said one input, whereby said film is driven in continuous or slew manner, and whereby reconnection of said actuating means to said other input will effect resumption of intermittent drive without distrubing the precise framing adjustment effected by said framing means.

* * * * *